(12) United States Patent
Roodenburg

(10) Patent No.: US 11,952,245 B2
(45) Date of Patent: Apr. 9, 2024

(54) HOISTING CRANE FOR USE ON AN OFFSHORE VESSEL AND METHOD OF OPERATION

(71) Applicant: ITREC B.V., Schiedam (NL)

(72) Inventor: Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 316 days.

(21) Appl. No.: 17/616,328

(22) PCT Filed: May 26, 2020

(86) PCT No.: PCT/EP2020/064600
§ 371 (c)(1),
(2) Date: Dec. 3, 2021

(87) PCT Pub. No.: WO2020/244973
PCT Pub. Date: Dec. 10, 2020

(65) Prior Publication Data
US 2022/0324681 A1   Oct. 13, 2022

(30) Foreign Application Priority Data
Jun. 7, 2019 (NL) ...................................... 2023280

(51) Int. Cl.
*B63B 27/08* (2006.01)
*B63B 27/10* (2006.01)
(Continued)

(52) U.S. Cl.
CPC .............. *B66C 23/52* (2013.01); *B63B 27/08* (2013.01); *B63B 27/10* (2013.01); *B63B 35/44* (2013.01);
(Continued)

(58) Field of Classification Search
CPC ..... B66C 23/703; B66C 23/708; B66C 23/52; B66C 23/82; B63B 27/08; B63B 27/10
See application file for complete search history.

(56) References Cited

U.S. PATENT DOCUMENTS 4,253,579 A * 3/1981 Williams ................. E02F 3/48
52/650.2
8,919,586 B2 * 12/2014 Roodenburg ........... B66C 23/64
212/347
(Continued)

FOREIGN PATENT DOCUMENTS

| WO | WO 2008/100137 A2 | 8/2008 |
| WO | WO 2009/131442 A1 | 10/2009 |
| WO | WO 2018/052283 A1 | 3/2018 |

OTHER PUBLICATIONS

Dutch Search Report, issued in Priority Application No. 2023280, dated Feb. 4, 2020.
(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A hoisting crane or multi configurations crane system for use on an offshore vessel, such a vessel and methods for operating are disclosed. The hoisting crane comprises a boom having a proximal portion, an intermediate portion and a distal portion. An extension mechanism is provided that is configured to allow the distal portion to be slid relative to the intermediate portion from a retracted configuration to an extended configuration. In the retracted configuration, the intermediate portion is arranged substantially within the distal portion.

15 Claims, 10 Drawing Sheets

(51) Int. Cl.
    *B63B 35/44*     (2006.01)
    *B66C 23/18*     (2006.01)
    *B66C 23/52*     (2006.01)
    *B66C 23/70*     (2006.01)
    *B66C 23/82*     (2006.01)
    *F03B 13/10*     (2006.01)
    *F03D 13/10*     (2016.01)

(52) U.S. Cl.
    CPC .......... *B66C 23/185* (2013.01); *B66C 23/703* (2013.01); *B66C 23/708* (2013.01); *B66C 23/82* (2013.01); *F03D 13/10* (2016.05); *B63B 2035/446* (2013.01); *B66C 2700/0321* (2013.01); *F05B 2230/6102* (2013.01)

(56) References Cited

U.S. PATENT DOCUMENTS

| | | | | |
|---|---|---|---|---|
| 10,221,051 | B2 * | 3/2019 | Chiasson | B66C 23/62 |
| 11,542,130 | B2 * | 1/2023 | Woldring | B66C 23/16 |
| 2007/0084816 | A1 * | 4/2007 | Roodenburg | B66C 13/06 |
| | | | | 212/270 |
| 2007/0098504 | A1 * | 5/2007 | Roodenburg | F16L 1/18 |
| | | | | 405/166 |
| 2010/0102017 | A1 * | 4/2010 | Roodenburg | B66C 23/82 |
| | | | | 212/295 |
| 2011/0031205 | A1 * | 2/2011 | Roodenburg | B66C 23/84 |
| | | | | 212/239 |
| 2011/0114587 | A1 * | 5/2011 | Roodenburg | B66C 23/64 |
| | | | | 212/347 |
| 2016/0289051 | A1 * | 10/2016 | Chiasson | B66C 23/16 |
| 2019/0218075 | A1 * | 7/2019 | Woldring | B66C 23/707 |
| 2019/0248631 | A1 * | 8/2019 | Roodenburg | B66C 23/84 |

OTHER PUBLICATIONS

International Search Report, issued in PCT/EP2020/064600, dated Jul. 27, 2020.

Written Opinion of the International Searching Authority, issued in PCT/EP2020/064600, dated Jul. 27, 2020.

* cited by examiner

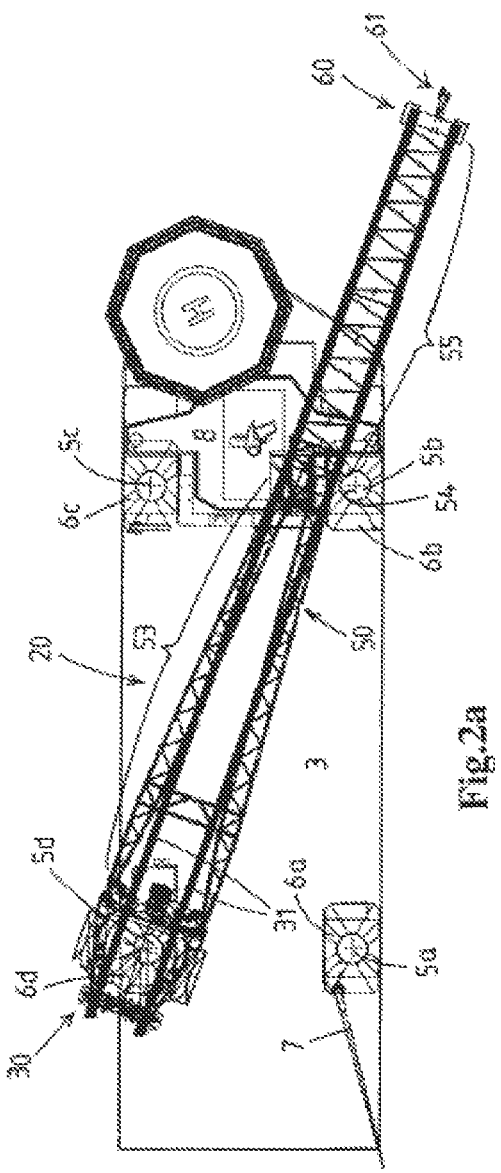

HOISTING CRANE FOR USE ON AN OFFSHORE VESSEL AND METHOD OF OPERATION

FIELD OF THE INVENTION

The present invention relates to a hoisting crane and a multi configurations crane system for use on an offshore vessel, such a vessel and methods for operating such a hoisting crane, multi configurations crane system and/or vessel.

The invention relates in particular to a hoisting crane for use in handling of one or more offshore wind turbine components, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine.

BACKGROUND OF THE INVENTION

In the field of offshore wind turbines the need exists for the handling by a tall crane of components "at the height of the nacelle", which includes for example the handling of the nacelle itself, and/or one or more components that are housed in a nacelle and/or mounted on the nacelle, e.g. gearbox, generator, hub and/or blades, of an offshore wind turbine.

Current designs of offshore wind turbines propose or already have the nacelle at a height of more than 100 meters above sea level, e.g. at 120 meters or more. Therefore, the handling of such components requires a very tall crane. In addition, the mass of such components can be significant, in the range of 5-150 tons, with components like the generator and gearbox being in the upper portion of this range.

In a common approach, the vessel is a jack-up vessel that is positioned close to the wind turbine and then the legs are extended and the vessel is lifted, at least in part but mostly entirely, to provide a stabilized situation for the crane operation.

Hoisting cranes are known, comprising:
a base structure adapted to be mounted on the vessel;
a superstructure mounted to the base structure, being provided with:
  a top cable guide at a top thereof; and
  a boom connection member;
a boom having a longitudinal axis A and a length of 80-200 meters;
a boom head structure provided at a tip end of the boom;
a luffing device for pivoting the boom up and down, comprising a luffing winch and a variable length luffing system; the variable length luffing system extending from the luffing winch via the top cable guide to the boom head structure;
a hoisting device for hoisting a load, comprising a hoisting winch and an associated hoisting cable; the hoisting cable extending from the hoisting winch to a main hoist cable guide on the boom head structure.

OBJECT OF THE INVENTION

As the offshore wind turbines increase in size, larger hoisting cranes are required. However, a large crane may be disadvantageous for the stability of the vessel during transport of the vessel.

SUMMARY OF THE INVENTION

Therefore, the invention provides a hoisting crane for use on an offshore vessel, the hoisting crane comprising:

a base structure adapted to be mounted on the vessel;
a superstructure mounted to the base structure, being provided with:
  a top cable guide at a top thereof; and
  a boom connection member comprising a left-hand connector and a right-hand hand connector at a mutual distance of each other, together defining a horizontal pivot axis;
a boom having a longitudinal axis; wherein the boom has an inner end connected to the left-hand connector and right-hand connector of the boom connection member, so that the boom can be pivoted up and down about the horizontal pivot axis which is perpendicular to the longitudinal axis of a boom;
a boom head structure provided at a tip end of the boom;
a luffing device for pivoting the boom up and down, comprising a luffing winch and a variable length luffing system; the variable length luffing system extending from the luffing winch via the top cable guide to the boom head structure;
a hoisting device for hoisting a load, comprising a hoisting winch and an associated hoisting cable; the hoisting cable extending from the hoisting winch to a main hoist cable guide on the boom head structure;
wherein the boom comprises:
a proximal portion connected to the boom connection member; and wherein the proximal portion of the boom comprises a left-hand boom leg and a right-hand boom leg of equal length extending between a joint structure and the left-hand connector of the boom connection member and the right-hand connector of the boom connection member, respectively, such that the left-hand boom leg and the right-hand boom leg converge towards each other in the direction of the joint structure, forming a clearance therebetween of an essentially triangular shape seen in a plane defined by the substantially horizontal pivot axis and the longitudinal axis of the boom;
a distal portion comprising the boom head structure to which the variable length luffing system and the hoisting cable extend, wherein the distal portion has a first cross-sectional size in a cross-section perpendicular to a longitudinal axis of the distal portion, and
an intermediate portion connected to the proximal portion, wherein the intermediate portion has a second cross-sectional size in a cross-section perpendicular to a longitudinal axis of the intermediate portion which is smaller than said first cross-sectional size of said distal portion,
wherein the distal portion and the intermediate portion are arranged such that their respective longitudinal axes are parallel,
wherein an extension mechanism is provided, said extension mechanism being configured allow the distal portion to be slid relative to the intermediate portion in a longitudinal direction of the boom from a retracted configuration to an extended configuration and vice versa,
wherein a locking mechanism is provided for locking the distal portion relative to the intermediate portion in the retracted configuration and in the extended configuration, and
wherein in the retracted configuration the intermediate portion is arranged substantially within the distal portion.

It is noted that the invention is primarily envisaged for the offshore wind turbine field, so for maintenance, and also for installation and/or decommission of wind turbines. However, the invention may also be of use in other offshore applications, like oil & gas related jobs, civil engineering operations, etc.

According to the present invention, the boom comprises a proximal portion, an intermediate portion and a distal portion. The proximal portion is connected to the boom connection member, and comprises a left-hand boom leg and the right-hand boom leg. Hence, the boom has a general Y-shape with two boom legs connected to the boom connection member. Optionally the length of the distal portion between the joint and the boom head structure exceeds 30 meters. Particular advantages of this design are its strength resulting from the clearance between the boom legs, its possibility to elongate/shorten the boom relatively easily, and the compact tip end of the boom which is advantageous for the transmittance of forces, in combination with adequate hoist characteristics. The proximal portion may embodied according to any of the embodiments disclosed in WO2018/208158 by the same applicant, which is incorporated herein by reference.

According to the invention, the distal portion can be slid from a retracted configuration to an extended configuration. This can be done using the extension mechanism. Advantageously, the length of the boom can be increased as such. For example, during operation the length can increased such that the hoisting crane can be used on a larger offshore wind turbine. During transport with the offshore vessel however, the length can be decreased by arranging the distal portion in the retracted configuration. It is noted that it is envisaged that both the retracted and the extended configuration may be a hoisting configuration, meaning that in both the retracted and the extended configuration it is possible to hoist a load with the hoisting crane.

The intermediate portion has a second cross-sectional size, which is smaller than a first cross-sectional size of the distal portion. Therefore, in the retracted configuration, the intermediate portion is arranged substantially within the distal portion. It is noted that this is different from traditional telescopic cranes. This has several advantages. For example, the variable length luffing system only requires connection with the distal portion, in particular the boom head structure. Furthermore, strength of the boom and stability during hoisting can be increased by on the one side the distal portion having a larger cross-sectional size, and on the other hand the intermediate portion being able to have additional lattice bars for strength within the cross-sectional area.

In an embodiment, the intermediate portion is formed by a lattice structure comprising a plurality of corner chords, wherein lattice bars are provided between non-subsequent corner chords. Advantageously the strength is increased, which is made possible by the design of the intermediate portion having a cross-sectional size that is smaller than the cross-sectional size of the distal portion, because the distal portion does not need to be arranged within the intermediate portion at any time.

In an embodiment, the locking mechanism comprises pins that preferably are remotely operable. For example, one or more pins may be formed as an extendable cylinder that extend into a hole, essentially forming a pin to a pin-hole connection. Alternatively, an extendable cylinder may be attached to a mechanical locking part, for example a pin of a pin-hole connection, which is brought into a locking position when the extendable cylinder either extends or retract. Optionally, the extendable cylinder can be operated to extend and retract from a distance, for example by an operator on the vessel.

In an embodiment, the distal portion is configured to be connected to the proximal portion in the retracted configuration. For example, the intermediate portion may be shorter in the longitudinal direction than the distal portion, allowing the distal portion to be arranged adjacent to the proximal portion in the retracted configuration. The connection may e.g. be accomplished using pin-hole connection, that are preferably remotely operable. In this embodiment, at least a majority of the forces during a hoisting operation in the retracted configuration are transferred from the boom head structure to the proximal portion via the distal portion rather than the intermediate portion. This is advantageous as the cross-sectional size of the distal portion is greater, providing more stability and higher resistance to buckling and bending.

In an embodiment, the intermediate portion is configured to be removable, and the distal portion is configured to be connectable to the proximal portion. So, the intermediate portion can be removed and the boom can be assembled without the intermediate portion, directly connecting the distal portion to the proximal portion. Advantageously this embodiment allows to only use the intermediate portion when needed. For example, the intermediate portion can be transferred to another location and be assembled in another hoisting crane. Furthermore, this embodiment allows to perform maintenance on the intermediate portion on shore while it is not arranged in the hoisting crane. Another advantage is that it is also possible to provide another intermediate portion, e.g. having a greater length. As such, when e.g. the offshore wind turbines increase further in size, a new intermediate portion is sufficient to adapt the hoisting crane for increasing requirements.

In an embodiment, the distal portion is configured to be slid from the retracted configuration to the extended configuration when the boom is in a substantially upright position. This may e.g. be advantageous when little space is available around the hoisting crane. The hoisting crane can be assembled and moved while in the retraced configuration, thereby occupying relatively little space. Once on the correct location, the hoisting can be arranged substantially upright, to only be arranged in the extended configuration thereafter.

In an embodiment, the extension mechanism comprises an extension winch and an associated extension cable, wherein a sliding movement of the distal portion relative to the intermediate portion is accomplished operating the extension winch. Optionally the extension winch is arranged in the proximal portion, the base structure, or the superstructure. Optionally slide pads are provided between the distal portion and the intermediate portion to facilitate the sliding movement. Other configurations to slide the distal portion relative to the intermediate portion are also possible.

In an embodiment, the boom has a length of 80-200 meters in the extended configuration, e.g. 130 meters.

The invention further relates to a multi configurations crane system comprising:
- a base structure adapted to be mounted on the vessel;
- a superstructure mounted to the base structure, being provided with:
    i. a top cable guide at a top thereof; and
    ii. a boom connection member comprising a left-hand connector and a right-hand hand connector at a mutual distance of each other, together defining a horizontal pivot axis;
- a boom having a longitudinal axis; wherein the boom has an inner end connected to the left-hand connector and right-hand connector of the boom connection member, so that the boom can be pivoted up and down about the horizontal pivot axis which is perpendicular to the longitudinal axis of a boom;

a boom head structure provided at a tip end of the boom;

a luffing device for pivoting the boom up and down, comprising a luffing winch and a variable length luffing system; the variable length luffing system extending from the luffing winch via the top cable guide to the boom head structure;

a hoisting device for hoisting a load, comprising a hoisting winch and an associated hoisting cable; the hoisting cable extending from the hoisting winch to a main hoist cable guide on the boom head structure;

wherein the multi configurations crane system comprises at least the following components for assembling the boom:

a proximal portion configured to be connected to the boom connection member; wherein the proximal portion of the boom comprises a left-hand boom leg and a right-hand boom leg of equal length extending between a joint structure and the left-hand connector of the boom connection member and the right-hand connector of the boom connection member, respectively, such that the left-hand boom leg and the right-hand boom leg converge towards each other in the direction of the joint structure, forming a clearance therebetween of an essentially triangular shape seen in a plane defined by the substantially horizontal pivot axis and the longitudinal axis of the boom;

a distal portion comprising the boom head structure to which the variable length luffing system and the hoisting cable extend, wherein the distal portion has a first cross-sectional size in a cross-section perpendicular to a longitudinal axis of the distal portion, and an intermediate portion, wherein the intermediate portion has a second cross-sectional size in a cross-section perpendicular to a longitudinal axis of the intermediate portion which is smaller than said first cross-sectional size of said distal portion, the multi configurations crane system having at least a first configuration and a second configuration, wherein in the first configuration the intermediate portion is connected to the proximal portion, wherein the distal portion and the intermediate portion are arranged such that their respective longitudinal axes are parallel, wherein an extension mechanism is provided, said extension mechanism being configured allow the distal portion to be slid relative to the intermediate portion in a longitudinal direction of the boom from a retracted configuration to an extended configuration and vice versa, wherein a locking mechanism is provided for locking the distal portion relative to the intermediate portion in the retracted configuration and in the extended configuration, and wherein in the retracted configuration the intermediate portion is arranged substantially within the distal portion, and in the second configuration the distal portion is connected to the proximal portion, wherein the boom is assembled without the intermediate portion.

The multi configurations crane system according to the invention is based on the same inventive principle as the hoisting crane according to the invention. In general, the same advantages therefore apply, and embodiments explained above with reference to the hoisting crane according to the invention may therefore also be applied to the multi configurations crane system according to the invention.

In the first configuration, the boom is assembled using intermediate portion, and in the second configuration without the intermediate portion. Advantageously this embodiment allows to only use the intermediate portion when needed. For example, the intermediate portion can be transferred to another location and be assembled in another hoisting crane. Furthermore, this embodiment allows to perform maintenance on the intermediate portion on shore while it is not arranged in the hoisting crane.

In an embodiment the multi configurations crane system further comprises a further intermediate portion having a third cross-sectional size in a cross-section perpendicular to a longitudinal axis of the boom which is smaller than said first cross-sectional size of said distal portion, wherein the further intermediate portion has a longitudinal length which differs from a longitudinal length of the intermediate portion. In this embodiment the multi configurations crane system has a third configuration, wherein the further intermediate portion is connected to the proximal portion, wherein the distal portion and the further intermediate portion are arranged such that their respective longitudinal axes are parallel, wherein the distal portion is configured to be slid relative to the further intermediate portion in a longitudinal direction of the boom from a retracted configuration to an extended configuration and vice versa, and the distal portion is configured to be locked relative to the further intermediate portion in the retracted configuration and in the extended configuration, and wherein in the retracted configuration the further intermediate portion is arranged substantially within the distal portion. Advantageously the further intermediate portion can be provided based on the requirements for a hoisting job. The flexibility of the crane system is increased. In addition, when a boom of greater length is required, it is possible to manufacture and provide a new intermediate portion with greater length, rather than requiring a new hoisting crane.

The main hoist of a crane determines the main hoist capacity of the crane. In an embodiment, the main hoist and the connection to the luffing system are provided at essentially the same location along the longitudinal axis of the boom. In addition, thereto it is possible to provide additional hoists, e.g. a whiphoist at a location distal from the location of the connection to the luffing system. Such additional hoists have a lower hoist capacity than the main hoist.

In embodiments, the ratio between the proximal portion and the distal portion is generally between 1:1 and 3:1, advantageously between 1:1 and 2:1. Such a ratio provides an optimum strength.

In an embodiment, the boom may be a so-called singe lattice boom. Alternatively, A-frame lattice booms are known which have generally the shape of an A with two boom legs connected to the boom connection member. In such embodiments, the boom connection member comprises a left-hand connector and a right-hand hand connector at a mutual distance of each other, together defining a horizontal pivot axis. The boom has an inner end connected to the left-hand connector and to the right-hand connector of the boom connection member, so that the boom can be pivoted up and down about the horizontal pivot axis which is perpendicular to the longitudinal axis of a boom In embodiments, the hoisting crane, further comprising an annular bearing structure, wherein the superstructure is moveably mounted to the base structure via the bearing structure to allow the superstructure with the boom connection member to revolve about a vertical revolving axis relative to the base structure. Hence, this results in a revolving hoist crane.

In embodiments, the proximal portion further comprises one or more connection members oriented parallel to the substantially horizontal pivot axis, connecting the two boom legs in the clearance between them. Such a connection member can be provided relatively close to the horizontal pivot axis. There is a relatively large design freedom for such a connection member, also referred to as cross beam.

In embodiments, the luffing winch is mounted to a foot portion of the superstructure, opposite the boom connection member. This is advantageous in view of forming a counterweight. Advantageously, also the main hoist winch is mounted here, adjacent the luffing winch.

In embodiments, the hoisting crane further comprising a whiphoist, mounted to the boom head structure.

In embodiments, the superstructure comprises an open frame, also known as "gantry". This is in particular advantageous when the hoisting crane is used as an 'around the leg'—crane around a jack-up leg.

The invention further relates to an offshore vessel for use in handling of one or more offshore wind turbine components, e.g. the nacelle and/or one or more components that are housed in a nacelle and/or mounted on the nacelle, e.g. hub and/or blades, of an offshore wind turbine, e.g. for installation and/or maintenance of an offshore wind turbine, wherein the vessel is provided with such a hoisting crane.

In embodiments, the vessel is a marine jack-up type crane vessel comprising:
a hull with a deck,
a plurality of jack-up legs, each of which legs is movable in a vertical direction with respect to the hull,
a plurality of generally vertical leg openings extending through the hull, and wherein the jack-up legs extend through the hull via one of said vertical leg openings;
a plurality of jack-up housings provided on deck and housing the vertical leg openings, and wherein the base structure is formed integral with a jack-up housing.

The invention further relates to several methods for operating a hoisting crane, a multi configurations crane system and/or a vessel according to the invention, which will be elaborated on below. It is noted that features and embodiments explained with reference a hoisting crane, a multi configurations crane system and/or a vessel according to the invention, can also be applied to the methods according to the invention.

The invention relates to a method for operating a hoisting crane, a multi configurations crane system and/or an offshore vessel according to the invention, comprising the following steps:
arranging the distal portion in the retracted configuration,
hoisting a first load while the distal portion is in the retracted configuration,
arranging the distal portion in the extended configuration,
hoisting a second load while the distal portion is in the extended configuration.

The invention relates to a method for operating a hoisting crane, a multi configurations crane system and/or an offshore vessel according to the invention, comprising the following steps:
assembling the hoisting crane or multi configurations crane system with the intermediate portion connected to the proximal portion,
hoisting a first load while the intermediate portion is connected to the proximal portion,
at least partially disassembling the boom to remove the intermediate portion,
reassemble the boom with the distal portion connected to the proximal portion,
hoisting a second load while the distal portion connected to the proximal portion.

The invention relates to a method for operating a multi configurations crane system, comprising the following steps:
assembling the multi configurations crane system with the intermediate portion connected to the proximal portion,
hoisting a first load while the intermediate portion is connected to the proximal portion,
at least partially disassembling the boom to remove the intermediate portion,
reassemble the boom with the further intermediate portion connected to the proximal portion,
hoisting a second load while the further intermediate portion is connected to the proximal portion.

The invention further relates to a method for hoisting an offshore wind turbine component, e.g. the nacelle and/or one or more components that are housed in a nacelle and/or mounted on the nacelle, e.g. gearbox, generator, hub and/or blades, of an offshore wind turbine, e.g. for installation and/or maintenance of an offshore wind turbine, wherein use is made of such a hoisting crane, a multi configurations crane system and/or a vessel according to the invention.

In a second aspect the invention also relates to a hoisting crane for use on an offshore vessel, the hoisting crane comprising:
a base structure adapted to be mounted on the vessel;
a superstructure mounted to the base structure, being provided with:
a top cable guide at a top thereof; and
a boom connection member defining a horizontal pivot axis;
a boom having a longitudinal axis; wherein the boom has an inner end connected to the left-hand connector and right-hand connector of the boom connection member, so that the boom can be pivoted up and down about the horizontal pivot axis which is perpendicular to the longitudinal axis of a boom;
a boom head structure provided at a tip end of the boom;
a luffing device for pivoting the boom up and down, comprising a luffing winch and a variable length luffing system; the variable length luffing system extending from the luffing winch via the top cable guide to the boom head structure;
a hoisting device for hoisting a load, comprising a hoisting winch and an associated hoisting cable; the hoisting cable extending from the hoisting winch to a main hoist cable guide on the boom head structure;
wherein the boom comprises:
a proximal portion connected to the boom connection member;
a distal portion comprising the boom head structure to which the variable length luffing system and the hoisting cable extend, wherein the distal portion has a first cross-sectional size in a cross-section perpendicular to a longitudinal axis of the distal portion, and
an intermediate portion connected to the proximal portion, wherein the intermediate portion has a second cross-sectional size in a cross-section perpendicular to a longitudinal axis of the intermediate portion which is greater than said first cross-sectional size of said distal portion,
wherein the distal portion and the intermediate portion are arranged such that their respective longitudinal axes are parallel,
wherein an extension mechanism is provided, said extension mechanism being configured allow the distal portion to be slid relative to the intermediate portion in a longitudinal direction of the boom from a retracted configuration to an extended configuration and vice versa, wherein a locking mechanism is provided for locking the distal portion relative to the intermediate portion in the retracted configuration and in the extended configuration, and, wherein in the retracted configuration the distal portion is arranged substantially within the intermediate portion.

In a second aspect the invention also relates to a hoisting crane as described in claim 1, wherein the intermediate portion has a second cross-sectional size in a cross-section perpendicular to a longitudinal axis of the intermediate portion which is greater, instead of smaller, than said first cross-sectional size of said distal portion. In addition, instead of that in the retracted configuration the intermediate portion is arranged substantially within the distal portion, according to the second aspect in the retracted configuration the distal portion is arranged substantially within the intermediate portion.

In a third aspect the invention also relates to a hoisting crane for use on an offshore vessel, the hoisting crane comprising:
- a base structure adapted to be mounted on the vessel;
- a superstructure mounted to the base structure, being provided with:
  - a top cable guide at a top thereof; and
  - a boom connection member defining a horizontal pivot axis;
- a boom having a longitudinal axis; wherein the boom has an inner end connected to the boom connection member, so that the boom can be pivoted up and down about the horizontal pivot axis which is perpendicular to the longitudinal axis of a boom;
- a boom head structure provided at a tip end of the boom;
- a luffing device for pivoting the boom up and down, comprising a luffing winch and a variable length luffing system; the variable length luffing system extending from the luffing winch via the top cable guide to the boom head structure;
- a hoisting device for hoisting a load, comprising a hoisting winch and an associated hoisting cable; the hoisting cable extending from the hoisting winch to a main hoist cable guide on the boom head structure;

wherein the boom comprises:
- a proximal portion connected to the boom connection member;
- a distal portion comprising the boom head structure to which the variable length luffing system and the hoisting cable extend, wherein the distal portion has a first cross-sectional size in a cross-section perpendicular to a longitudinal axis of the distal portion, and
- an intermediate portion connected to the proximal portion, wherein the intermediate portion has a second cross-sectional size in a cross-section perpendicular to a longitudinal axis of the intermediate portion which is smaller than said first cross-sectional size of said distal portion, wherein the distal portion and the intermediate portion are arranged such that their respective longitudinal axes are parallel, wherein an extension mechanism is provided, said extension mechanism being configured allow the distal portion to be slid relative to the intermediate portion in a longitudinal direction of the boom from a retracted configuration to an extended configuration and vice versa, wherein a locking mechanism is provided for locking the distal portion relative to the intermediate portion in the retracted configuration and in the extended configuration, and, wherein in the retracted configuration the intermediate portion is arranged substantially within the distal portion.

In a third aspect the invention also relates to a hoisting crane as described in claim 1, wherein the boom connection member defines a horizontal pivot axis an does not comprise a left hand connector and a right hand connector. According to this aspect the proximal portion is connected to the boom connection member; and the proximal portion of the boom extends between a joint structure and the boom connection member.

BRIEF DESCRIPTION OF THE DRAWINGS

The non-limiting example of the invention will be elucidated further in relation to the drawings, in which like reference numerals indicate like features. In the drawings:

FIG. 1b represents a detail of the crane of FIG. 1a;

FIG. 2a represents a top view of the jack-up type marine vessel of FIG. 1a;

FIG. 2b represents a detailed top view of the proximal portion of the boom of FIG. 2a;

FIG. 4a represents a detailed side view of the superstructure of the crane of FIG. 1a;

FIG. 4b represents a detailed side view of the base structure of the crane of FIG. 1a;

DETAILED DESCRIPTION OF EMBODIMENTS

The present invention relates to embodiments of hoisting cranes or multi configurations crane systems, which may e.g. be used on an offshore vessel. In FIGS. 1a-4b, an exemplary jack-up type marine vessel 1 is shown to elaborate on the known features of a hoisting crane and an offshore vessel. The details of the invention will thereafter be illustrated with reference to FIGS. 5a-5e.

The jack-up type marine vessel 1 shown in FIGS. 1a-4b comprises a hull 2 and a plurality of generally vertical leg openings 5a, 5b, 5c, 5d through the hull. Here, the hull is embodied as a vessel. Alternatively, the hull is embodied as a barge or a platform or a semi-submersible or the like. The shown hull 2 comprises a deck 3.

Figure 1A:
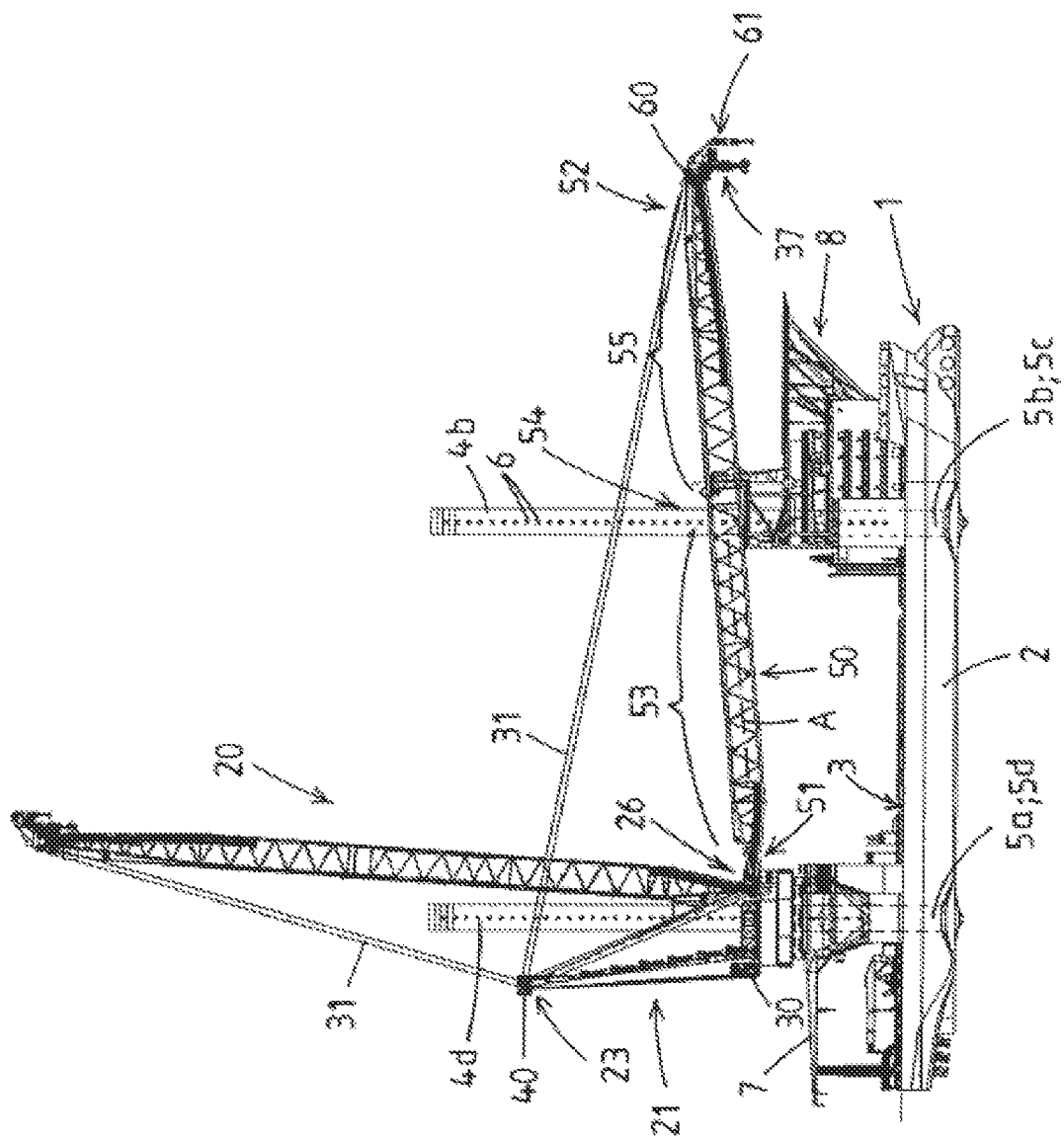
FIG. 1a represents a side view of a jack-up type marine vessel with a hoisting crane.
Figure 1B:
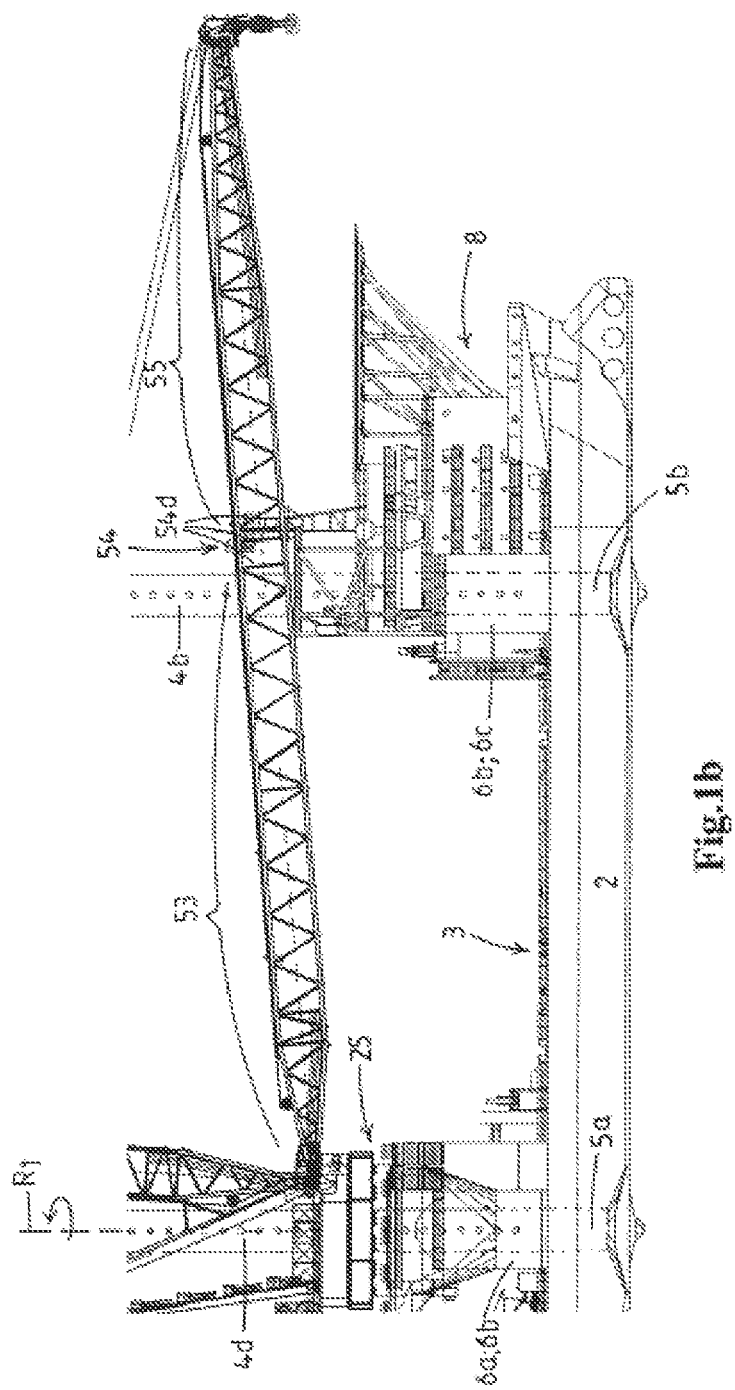

The leg openings 5a-5d are spaced about the hull. In FIGS. 1a and 1b, two of such openings are visible, while the vessel comprises four of such openings as visible in the top view of FIG. 2. Generally, a hull comprises 3, 4 or 6 of such openings to provide a stable jack-up type marine vessel.

A plurality of legs 4a, 4b, 4c, 4d extend through the hull 2 via the one of said vertical leg openings 5a, 5b, 5c, 5d respectively; each of which legs is movable in a vertical direction with respect to the hull. A plurality of elevating units is positioned at the vertical leg openings for changing the elevation of the hull relative to the legs, each of the elevating units being adapted to lift the hull when the legs engage the seabed. In the side view, again, only two of such legs are visible, while the vessel comprises four of such legs.

In the legs, openings 6 are visible which are able to receive pins (not visible) to fixate the hull relative to the legs.

In embodiments, the elevating units are adapted to lift the hull free of the water surface when the legs engage the seabed. It is also conceivable that the hull is semi-submersible and that the elevating units are able to position the hull partially under water when the legs engage the seabed.

In the shown embodiment, jack-up housings 6a, 6b, 6c, 6d are provided on deck 3 extending a distance above deck and housing the vertical leg openings 5a, 5b, 5c, 5d respectively, and possibly also the respective lifting units. Legs 4a, 4b, 4c, 4d respectively extend through these jack-up housings 6a-6d, as visible in the drawings.

The vessel 1 has a bow and a stern, wherein the vessel has a crew and bridge superstructure 8 at the bow of the vessel and wherein the vessel has a deck aft of said crew and bridge superstructure, and wherein a hoisting crane 20 is mounted at the stern of the vessel, in particular around the leg 6d.

In the shown embodiment, a small crane 7 is mounted on the jack-up housing 6a. Crew and bridge structure 8, including a helicopter platform, is provided adjacent and between jack-up housings 6b, 6c.

Advantageously, not shown in the present embodiment, the crew and bridge superstructure is arranged asymmetrically at said bow of the vessel, e.g. toward the starboard side thereof, and wherein the crane is arranged asymmetrically at the stern of the vessel, opposite from the centreline of the vessel relative to the crew and bridge superstructure, e.g. toward the port side thereof.

In the shown embodiment, a base structure 22 of the hoisting crane 20 is formed integrally with jack-up housing 6d. Here, the base structure is essentially shaped as a truncated cone, having a smaller and here square-shaped cross section at the bottom end, adjacent the jack-up housing 6d, and a larger, circular cross-section at its top end, e.g. having a diameter at the top of 13-16 meters. Said base structure is structurally anchored to the hull 2 via the jack-up housing 6d, independently of the leg 5d and its elevating unit.

In the shown embodiment, an annular bearing structure 25 is mounted on the base structure 22. The annular bearing structure 25 is thus provided a distance above the deck 3 of the vessel, e.g. 20-30 meters.

A superstructure 21 of the crane is mounted to the base structure 22 around the leg 4d. Here, the superstructure 21 is moveably mounted to the base structure via the bearing structure 25 to allow the superstructure to revolve about a vertical revolving axis R1 relative to the base structure and thus around the leg 6d, independently of the leg. Such a crane-type is known in the art as an 'around the leg-crane'.

In the shown embodiment, the center C of vertical leg opening 5d surrounded by jack-up housing 6d is indicated with the letter C. The superstructure revolves about R1, which is here closer to the port side of the vessel than the center C of the vertical leg opening of the jack-up housing onto which the hoisting crane is mounted. This is advantageous as it enlarges the available deck space. This is in particular advantageous in the shown embodiment wherein a hoisting crane having a relatively large bearing structure is used.

The superstructure 21 of the shown embodiment comprises an elongated A-shaped frame, also referred to as "gantry". It comprises a top 23, provided with a top cable guide 40. Furthermore, the superstructure 21 comprises a boom connection member 26, which is here mounted to a foot portion of the superstructure, adjacent the bearing structure 25.

Figure 2B:
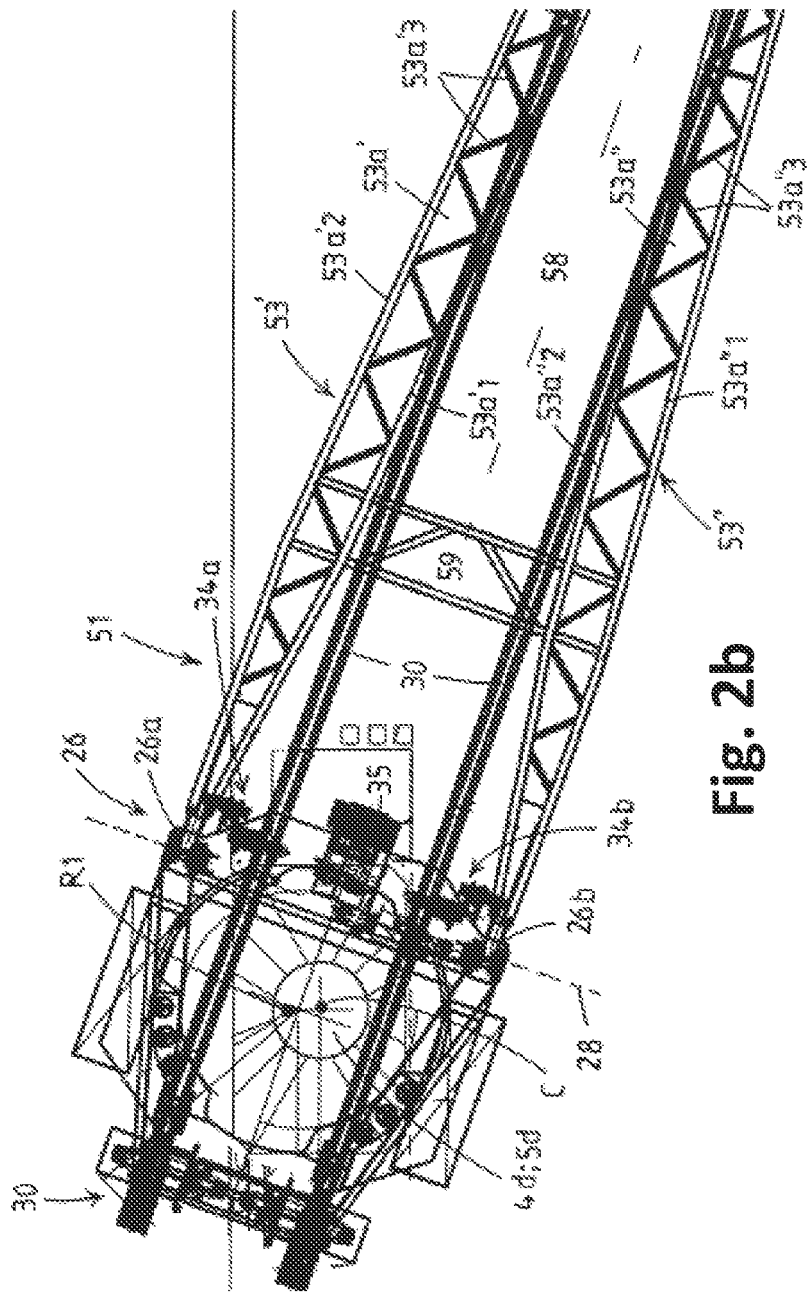
Figure 3B:
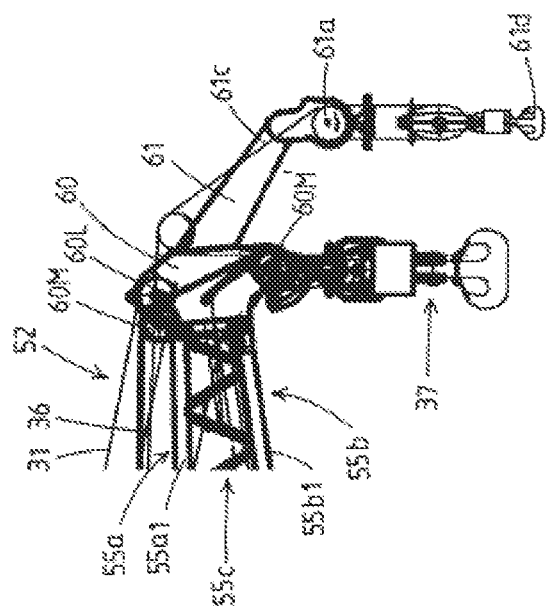
FIG. 3b represents a detailed side view of the boom head structure of FIG. 1a in a lowered position of the boom.
Figure 3A:
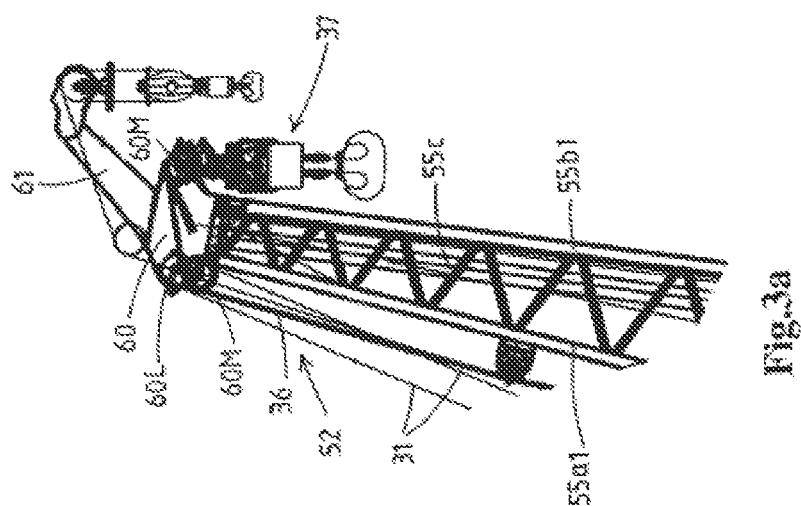
FIG. 3a represents a detailed side view of the boom head structure of FIG. 1a in a raised position of the boom.

The boom connection member 26, as shown in detail in FIG. 2b, comprising a left-hand connector 26a and a right-hand hand connector 26b at a mutual distance of each other, together defining a horizontal pivot axis 28.

In the shown embodiment, the connectors 26a and 26b have a mutual distance of 10-20 meters, in particular 15 meters. Such a large mutual distance requires a larger superstructure, and, when present, a larger bearing structure. In view of the above-indicated advantage of providing the rotation axis R1 closer to the port side (or starboard side) than the center of the vertical leg opening of the jack-up housing onto which the hoisting crane is mounted, it is evident that this advantage is in particular present in this type of cranes.

The crane further comprises a boom 50 having a longitudinal axis A and a length of 80-200 meters, for example 130 meters. In particular, the boom has a length and a boom working angle range such that the tip end thereof is positionable in a position wherein a tip end is at least 100 meters above the water. Possibly, an operation boom angle may vary between 5-90°, in particular between 15-86°. In FIGS. 1a and 1b, the boom is shown in distinct positions. In FIG. 1b, the boom 50 is shown in a lowered position. This may be an operational position. In the shown embodiment, the boom is at a storage position resting on a boom rest. The storage position of a boom may include an angle with the horizontal of between 0-15°. The boom has an inner end 51 connected to the left-hand connector and right-hand connector of the boom connection member 26, so that the boom can be pivoted up and down about the horizontal pivot axis 28 which is perpendicular to the longitudinal axis A of a boom.

At a tip end 52 of the boom, there is provided a boom head structure 60. This is shown in detail in FIGS. 3a and 3b. In the shown embodiment, the hoisting crane 20 further comprises a whiphoist 61, mounted to the boom head structure 60. The whiphoist 61 comprises a whiphoist pulley 61a, over which a whiphoist cable 61c is guided, which supports a whiphoist hook 61d.

The crane further comprises a luffing device for pivoting the boom up and down, comprising a luffing winch 30 and a variable length luffing system 31. The variable length luffing system 31 extends from the luffing winch 30, via the top cable guide 40 to the boom head structure 60, here to pulleys 60L provided on the boom head structure 60. In the shown embodiment, as in particular visible in FIG. 2b, the luffing winch 30 is mounted to a foot portion of the superstructure, adjacent the bearing structure 25 and opposite the boom connection member 26. This is advantageous in view of the balance of forces, it serves as a counterweight to the boom and object suspended therefrom.

In the shown embodiment, the variable length luffing system 31 comprises a cable. In alternative embodiments, it is conceivable that the variable length luffing system comprises a cable and rods, e.g. tie rods, e.g. connected to the boom head structure.

The hoisting crane 20 further comprises a hoisting device for hoisting a load, comprising a hoisting winches 34a, 34b (visible in FIG. 2b) and an associated hoisting cable 36. The hoisting cable 34 extends from the hoisting winches 34a, 34b to a main hoist cable guide 60M, 60M' on the boom head structure 60.

The hoisting winches 34a, 34b in the shown embodiment are mounted to the inner end 51 of the boom, adjacent the left-hand 26a and right-hand connector 26b of the boom connection member 26, respectively. Alternatively, the hoisting winch(es) are mounted to the superstructure, e.g. adjacent the luffing winch, or between the connectors of the boom connection member.

The hoisting cable 36 extends to an object suspension device 37, which here comprises a configuration of pulleys and yokes to be able to provide a versatile system, suitable to hoist heavy loads.

An operators cabin 35 is visible in the shown embodiment, mounted to a foot portion of the superstructure 21, adjacent the bearing structure 25 and between the left-hand 26a and right-hand connector 26b of the boom connection member 26.

The boom comprises a proximal portion 53 connected to the boom connection member 26 and a distal portion 55, which are connected via a joint structure 54. The length of the distal portion between the joint structure and the boom head structure 60 may exceed 30 meters.

In an embodiment, the overall boom length is 80-200 meters and the length of the distal portion is over 30 meters. The joint structure is a relatively short structure, having a length of 1-10, in particular 2-5 meters. The length ratio between the proximal portion and the distal portion is generally between 1:1 and 3:1, advantageously between 1:1 and 2:1. For example, for a boom length of 125 meters, the length of the proximal portion is about 65 meters and the length of the distal portion is about 55 meters.

As indicated above, in an embodiment, the distance between the left-hand connector and the right-hand connector is advantageously 10-20 meters. At the inner end of the boom, the mutual distance between the outer side faces of the boom legs of the proximal portion essentially corresponds to this mutual distance, and is hence also between 10-20 meters. The mutual distance between the side faces of the single distal portion is preferably 5-10 meters. In an embodiment, the mutual distance between the outer side faces of the boom legs of the proximal portion is 15 meters, and the mutual distance between the side faces of the single distal portion is 7 meters.

Advantageously, in an embodiment the ratio between mutual distance between the outer side faces of the boom legs of the proximal portion, and the mutual distance between the side faces of the single distal portion is generally between 1.75:1 and 2.25:1.

Figure 4A:
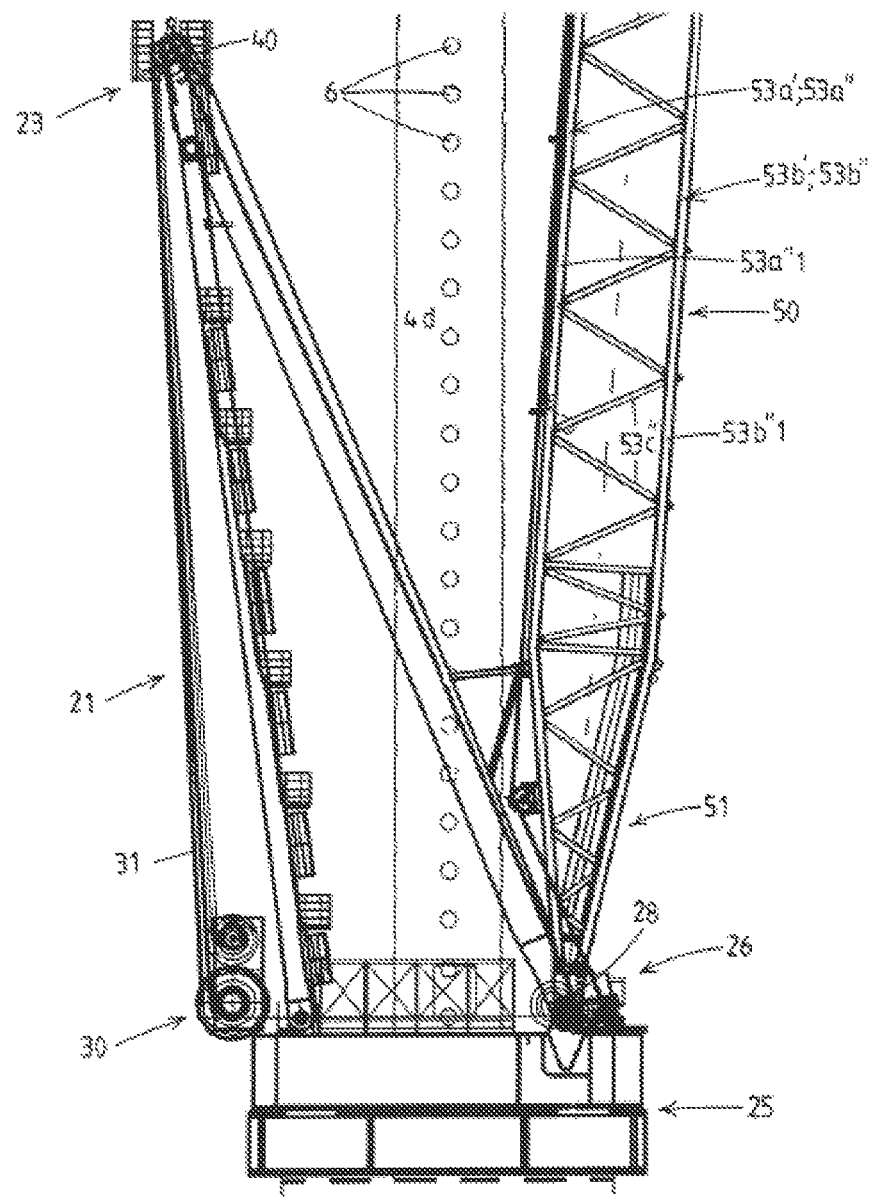
Figure 4B:
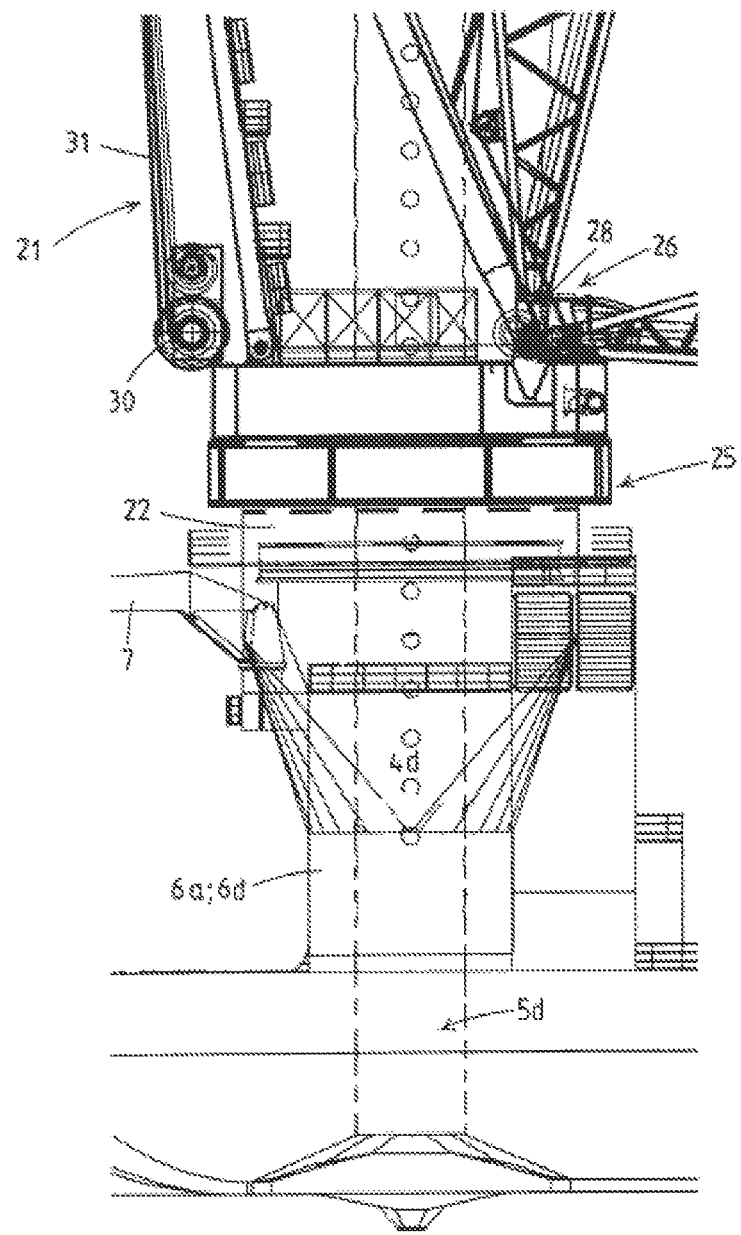

The proximal portion 53 of the boom is shown in detail in FIG. 2b, and partially in FIG. 4a.

The proximal portion 53 comprises a left-hand boom leg 53' and a right-hand boom leg 53" of equal length, extending between the joint structure 54 and the left-hand connector of the boom connection member 26a and the right-hand connector 26b of the boom connection member, respectively. The left-hand boom leg 53' and the right-hand boom leg 53" converge towards each other in the direction of the joint structure, forming a clearance 58 therebetween of an essentially triangular shape seen in a plane defined by the substantially horizontal pivot axis and the longitudinal axis of the boom.

In the shown embodiment, the proximal portion 53 further comprises a connection member 59 oriented parallel to the substantially horizontal pivot axis 28, connecting the two boom legs 53', 53" in the clearance 58 between them, to provide further structural stability.

At the inner end 51 of the boom, the boom legs 53', 53" are tapered to be connected to the left-hand connector 26a and the right-hand connector 26b respectively, which may e.g. be accomplished using one or more pins (not shown).

In the shown embodiment, each of the two boom legs 53', 53" comprises an upper and lower planar latticed truss (53a', 53b'; 53a", 53b") provided parallel to a plane defined by the substantially horizontal pivot axis and the longitudinal axis of the boom, each with two chords between which lacing elements extend. In particular, as visible in FIG. 2d, the upper planar latticed trusses 53a' and 53a" are shown, of the boom leg 53 and 53' respectively. Therebelow, not visible, are lower planar latticed trusses 53b' and 53b".

The upper planar latticed truss 53a' comprises two chords 53a'1 and 53a'2, between which lacing elements 53a'3 extend. The upper planar latticed truss 53a" comprises two chords 53a"1 and 53a"2, between which lacing elements 53a"3 extend.

The lower planar latticed truss 53b" is visible in the side view of FIG. 4a (with lower planar latticed truss 53b' of the other boom leg therebehind).

Each of the boom legs 53', 53" further comprises an outside lattice web and an inside lattice web. The inside lattice webs of the left-hand and right-hand boom legs face the clearance 58 between the boom legs.

In FIG. 4a the outside lattice web 53c" is visible, being connected to an outside chord 53a"1 of the upper planar latticed truss 53a" and an outside chord 53b"1 of the lower planar latticed truss 53b". "Parallel thereof is inside lattice web 53d" (indicated in FIG. 5a), being connected to an inside chord of the upper planar latticed truss and an inside chord of the lower planar latticed truss. Likewise, outside lattice web 53d' and inside lattice web 53c' of the left-hand boom leg 53' are indicated.

FIG. 5a-5e show a hoisting crane 120 according to the invention. The hoisting crane 120 according to the invention may comprise all the features that are referenced with respect to the hoisting crane 20 shown in FIG. 1-4b, except that the distal portion 55 is embodied differently, i.e. as distal portion 101. In addition, the hoisting crane 120 according to the invention comprises an intermediate portion 102. In the shown embodiment, also a different joint structure 103 is provided. It is noted that in FIG. 5a-5e the hoisting crane 120 is shown in isolation for the sake of clarity, but in practice the hoisting crane 120 may be arranged on a vessel 1 as e.g. shown in FIG. 1a, as is also apparent from the leg 4d which is visible.

Figure 5A:
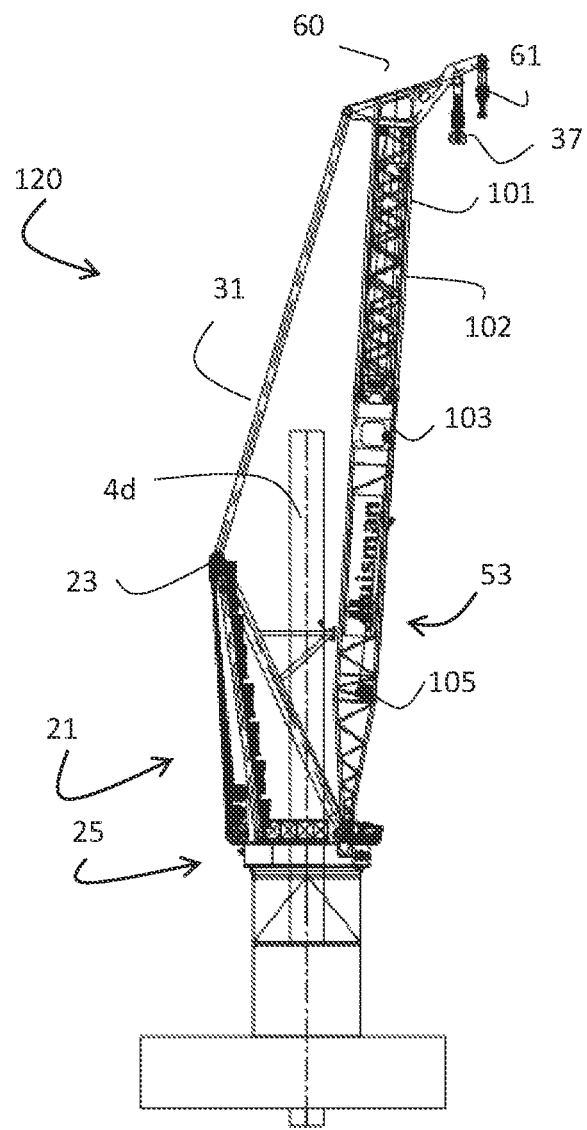
FIG. 5a shows a side view of a hoisting crane according to the invention in the retracted configuration.
Figure 5B:
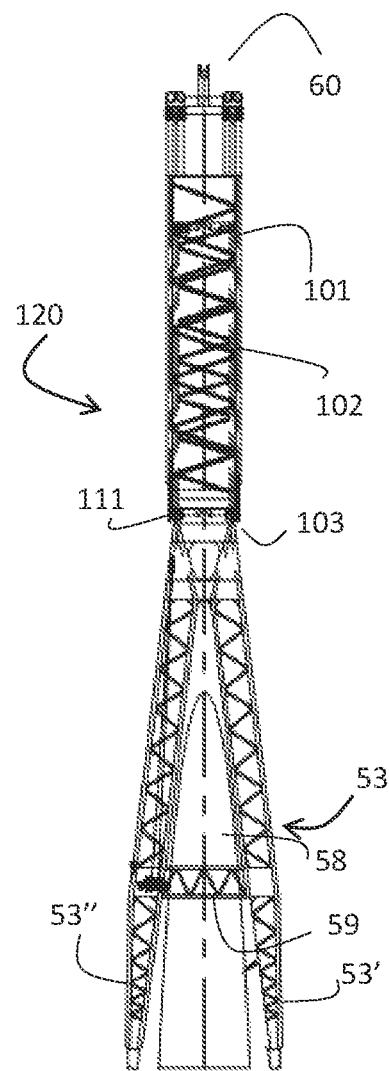
FIG. 5b shows a front view of the hoisting crane in the retracted configuration.
Figures 5C, 5D:
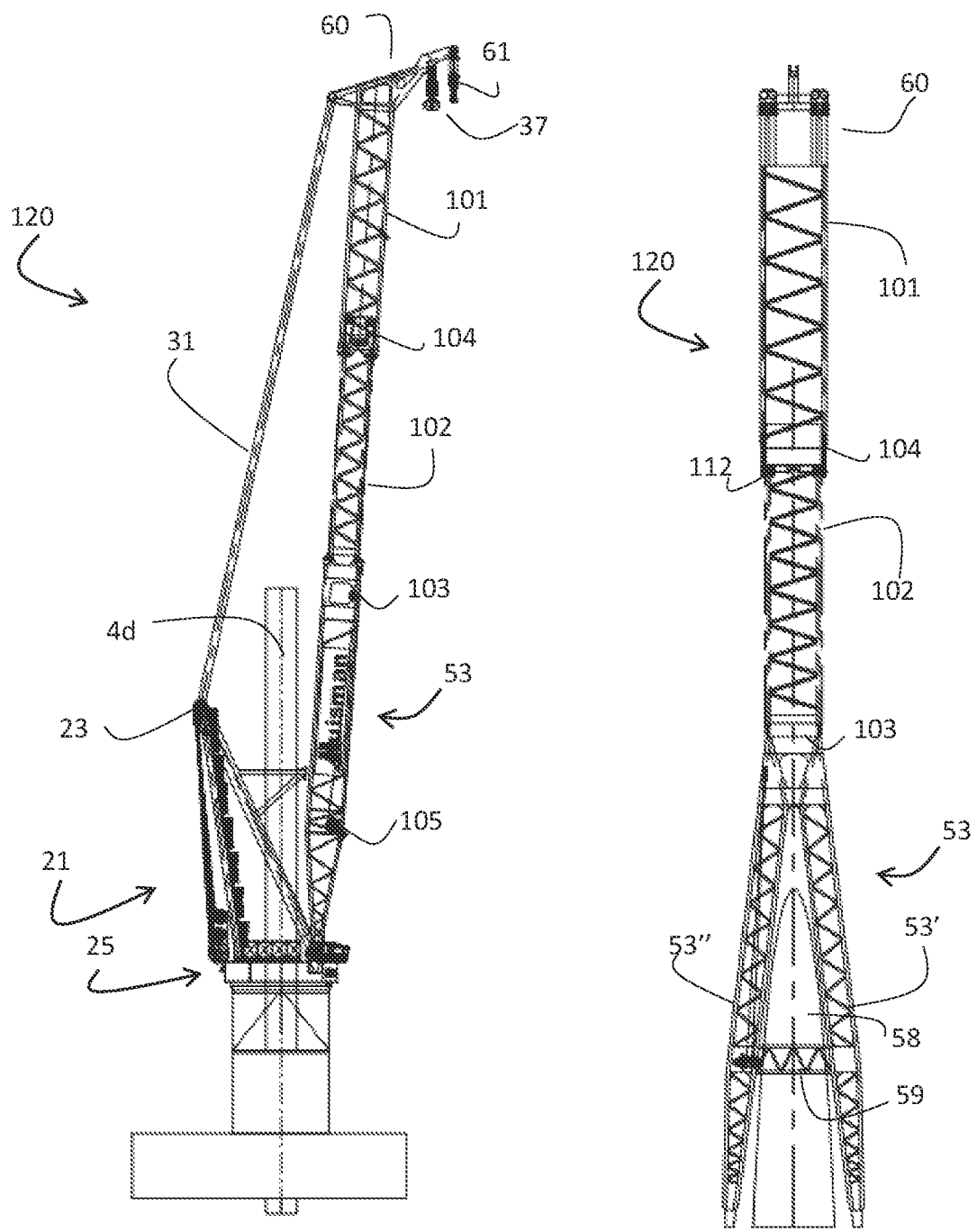
FIG. 5c shows a side view of the hoisting crane in the extended configuration.
FIG. 5d shows a front view of the hoisting crane in the extended configuration.
Figure 5E:
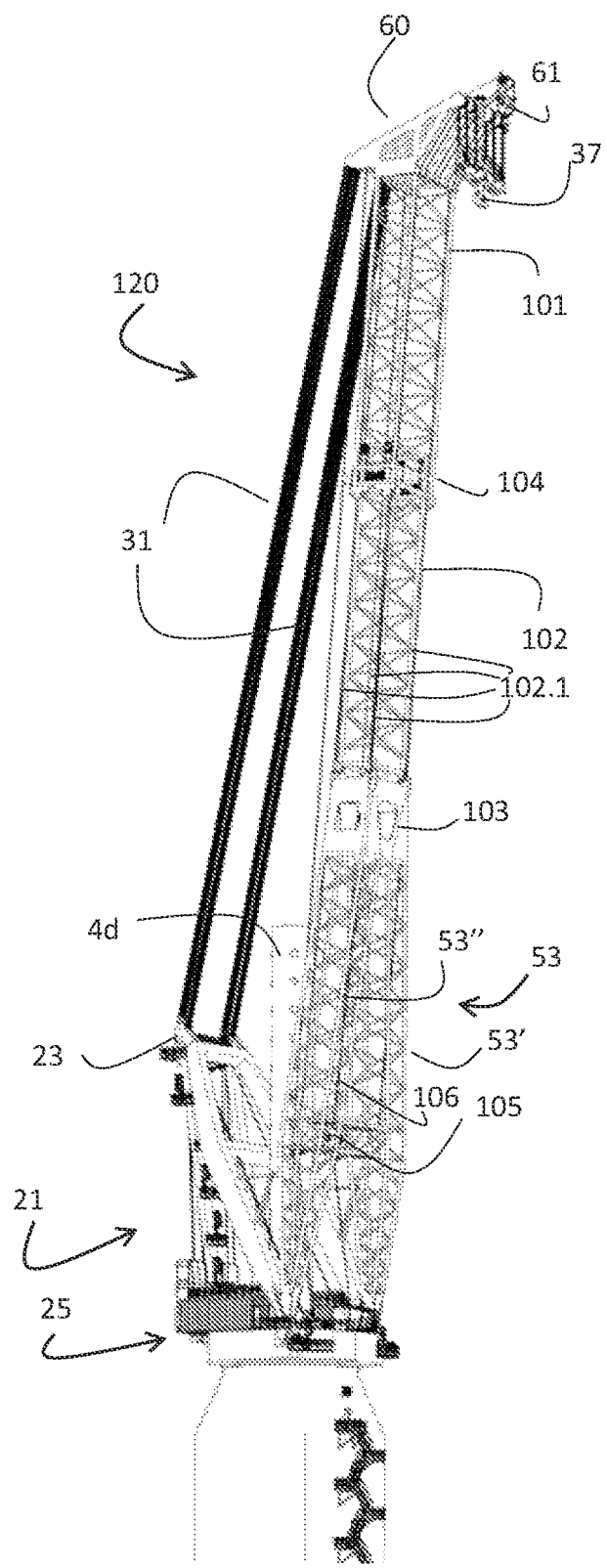
FIG. 5e shows a isometric view of the hoisting crane in the extended configuration.

FIGS. 5a and 5b show the hoisting crane 120 according to the invention in a retracted configuration in side view and front view, respectively. FIG. 5c, 5d, 5e shows a side view, front view and isometric view, respectively, of the hoisting crane in the extended configuration. As can be seen best in FIG. 5c-5e, the intermediate portion 102 is arranged between the proximal portion 53 and the distal portion 101 in the extended arrangement. The distal portion 101 and the intermediate portion 102 are arranged such that their respective longitudinal axes are parallel. According to the invention, the intermediate portion 102 has a second cross-sectional size in a cross-section perpendicular to a longitudinal axis of the intermediate portion which is smaller than a first cross-sectional size of said distal portion 101 in a cross-section perpendicular to a longitudinal axis of the distal portion 101. As a result thereof, in the retracted configuration, the intermediate portion 102 is arranged substantially within the distal portion 101, as can be seen in FIG. 5a-5b. This has several advantages. For example, the variable length luffing system 31 only requires connection with the distal portion 101, in particular the boom head structure 60. Furthermore, the strength of the boom and stability during hoisting can be increased by on the distal portion 101 having a larger cross-sectional size.

In the shown embodiment the proximal portion 53, the intermediate portion 102 and the distal portion 101 are each formed by a lattice structure. The intermediate portion 102 comprises plurality, in this case four, of corner chords 102.1, which are indicated in FIG. 5e. Although not depicted in the shown embodiment, in some embodiments lattice bars may be provided between non-subsequent corner chords. This is possible since, contrary to conventional telescopic arrangements, the intermediate portion 102 is arranged within distal portion 101 in the retracted configuration instead of that the distal portion 101 would be arranged within intermediate portion 102. As such, the strength of the intermediate portion 102 can be arranged.

According to the invention, an extension mechanism is provided, said extension mechanism being configured allow the distal portion 101 to be slid relative to the intermediate portion 102 in a longitudinal direction of the boom from the retracted configuration to the extended configuration. Preferably, the extension mechanism is allowed to operate in a raised and upright position of the boom, e.g. when the boom extends between 75-90° with the horizontal. Preferably, a boomstop is provided to fix the position of the boom prior to operating the extension mechanism. In the shown embodiment, the extension mechanism comprises an extension winch 105 and an associated extension cable 106 (see FIG. 5e), wherein a sliding movement of the distal portion 101 relative to the intermediate portion 102 is accomplished operating the extension winch 105. In the shown embodiment, the extension winch 105 is arranged in the proximal portion 53 of the boom and the extension cable 106 is arranged within the lattice structure of the boom, but other arrangements are possible. Sheaves may be provided provided in a top portion 104 of the intermediate portion 102, for guiding the extension cable 106. FIG. 5a-5e illustrate that optionally the distal portion 101 is configured to be slid from the retracted configuration to the extended configuration when the boom is in a substantially upright position.

According to the invention, a locking mechanism is provided for locking the distal portion 101 relative to the intermediate portion 102 in the retracted configuration and in the extended configuration. FIG. 5b shows that the locking comprises a pin-hole arrangement 111 for locking the distal portion 102 in the retracted configuration. In an advantageous embodiment, the distal portion 101 is configured to be connected to the proximal portion 53 in the retracted configuration, e.g. using said pin-hole arrangement 111, in this example to joint structure 103. This is advantageous, as forces during hoisting will be transferred at least for the majority from the boom head structure 60 to the proximal portion 53 via the distal portion 101 rather than the intermediate portion 102. As the second cross-sectional size of the distal portion 101 is greater, this improves the resistance against bending or buckling. FIG. 5d illustrates that in the shown embodiment in the extended configuration the distal portion 101 is locked to the intermediate portion 102 using a pin-hole arrangement 112 of the locking mechanism, provided at the top portion 104 of the intermediate portion 102. In a preferred embodiment, the pins of pin-hole arrangement 111 and pin-hole arrangement 112 are remotely operable.

The intermediate portion 102 is connected to the proximal portion via joint structure 103. In the shown example, joint structure 103 is adapted to receive pins for connecting the intermediate portion 102, as well as pins for locking the distal portion 101 in the retracted arrangement.

Optionally the intermediate portion 101 is configured to be removable. When the intermediate portion 101 is removed, the distal portion 101 may be connected directly to the proximal portion 53, e.g. using pin-hole arrangement 111. Advantageously this embodiment allows to only use the intermediate portion 102 when needed. For example, the intermediate portion 102 can be transferred to another location and be assembled in another hoisting crane. Furthermore, this embodiment allows to perform maintenance on the intermediate portion 102 on shore while it is not arranged in the hoisting crane 120. The hoisting crane 120 may therefore also be described as a multi configurations crane system 102 having at least a first configuration and a second configuration. In the first configuration the intermediate portion 102 is connected to the proximal portion 53, e.g. in accordance with FIG. 5a-5e. In the second configuration, the distal portion 101 is connected to the proximal portion 53, wherein the boom is assembled without the intermediate portion 102.

Removal of the intermediate section 102 may e.g. be done in a port. The hoisting crane 120 may be arranged with the proximal portion 53 on a resting structure. An auxiliary crane, e.g. a land-based crane, can be used to remove the intermediate portion 102 and thereafter connect the distal portion 101 to the proximal portion 53.

In an embodiment, the multi configuration crane 120 may further comprise a third arrangement, wherein use is made of a further intermediate portion (not shown). Said further intermediate portion may have a longitudinal length that is greater than the longitudinal length of the intermediate portion 102. As such, the length of the multi configurations crane 120 may be increased even further.

The invention claimed is:

1. A hoisting crane for use on an offshore vessel, the hoisting crane comprising:
    a base structure configured to be mounted on the vessel;
    a superstructure mounted to the base structure, and being provided with:
        a top cable guide at a top thereof; and
        a boom connection member defining a horizontal pivot axis;
    a boom having a longitudinal axis, wherein the boom has an inner end connected to the left-hand connector and right-hand connector of the boom connection member, so that the boom can be pivoted up and down about the horizontal pivot axis which is perpendicular to the longitudinal axis of a boom;
    a boom head structure provided at a tip end of the boom;
    a luffing device for pivoting the boom up and down, and comprising a luffing winch and a variable length luffing system, the variable length luffing system extending from the luffing winch via the top cable guide to the boom head structure; and
    a hoisting device for hoisting a load, and comprising a hoisting winch and an associated hoisting cable, the hoisting cable extending from the hoisting winch to a main hoist cable guide on the boom head structure,
    wherein the boom comprises:
        a proximal portion connected to the boom connection member;
        a distal portion comprising the boom head structure to which the variable length luffing system and the hoisting cable extend, wherein the distal portion has a first cross-sectional size in a cross-section perpendicular to a longitudinal axis of the distal portion; and an intermediate portion connected to the proximal portion, wherein the intermediate portion has a second cross-sectional size in a cross-section perpendicular to a longitudinal axis of the intermediate portion which is smaller than said first cross-sectional size of said distal portion, wherein the distal portion and the intermediate portion are arranged such that their respective longitudinal axes are parallel, wherein an extension mechanism is provided, said extension mechanism being configured to allow the distal portion to be slid relative to the intermediate portion in a longitudinal direction of the boom from a retracted configuration to an extended configuration and vice versa, wherein a locking mechanism is provided for locking the distal portion relative to the intermediate portion in the retracted configuration and in the extended configuration, and wherein in the retracted configuration the intermediate portion is arranged substantially within the distal portion.

2. The hoisting crane according to claim 1, wherein the boom connection member comprises a left-hand connector and a right-hand hand connector at a mutual distance of each other, together defining the horizontal pivot axis, and wherein the proximal portion of the boom comprises a left-hand boom leg and a right-hand boom leg of equal length extending between a joint structure and the left-hand connector of the boom connection member and the right-hand connector of the boom connection member, respectively, such that the left-hand boom leg and the right-hand boom leg converge towards each other in the direction of the joint structure, forming a clearance therebetween of an essentially triangular shape seen in a plane defined by the substantially horizontal pivot axis and the longitudinal axis of the boom.

3. The hoisting crane according to claim 1, wherein the intermediate portion is formed by a lattice structure comprising a plurality of corner chords, and wherein lattice bars are provided between non-subsequent corner chords.

4. The hoisting crane according to claim 1, wherein the locking mechanism comprises pins that are remotely operable.

5. The hoisting crane according to claim 1, wherein the distal portion is configured to be directly connected to the proximal portion in the retracted configuration, or in absence of the intermediate portion.

6. The hoisting crane according to claim 1, wherein the intermediate portion is configured to be removable, and wherein the distal portion is configured to be connectable to the proximal portion.

7. The hoisting crane according to claim 1, wherein the distal portion is configured to be slid from the retracted configuration to the extended configuration when the boom is in a substantially upright position.

8. The hoisting crane according to claim 1, wherein the extension mechanism comprises an extension winch and an associated extension cable, and wherein a sliding movement of the distal portion relative to the intermediate portion is accomplished operating the extension winch.

9. An offshore vessel for use in handling of one or more offshore wind turbine components, of an offshore wind turbine, wherein the vessel is provided with the hoisting crane according to claim 1.

10. A method for operating the hoisting crane according to claim 1, comprising the following steps:
arranging the distal portion in the retracted configuration;
hoisting a first load while the distal portion is in the retracted configuration;
arranging the distal portion in the extended configuration; and
hoisting a second load while the distal portion is in the extended configuration.

11. A method for operating the hoisting crane according to claim 1, comprising the following steps:
assembling the hoisting crane with the intermediate portion connected to the distal portion and to the proximal portion;
hoisting a first load;
at least partially disassembling the boom to remove the intermediate portion;
reassembling the boom with the distal portion directly connected to the proximal portion; and
hoisting a second load while the distal portion is directly connected to the proximal portion.

12. A multi configurations crane system comprising:
a base structure configured to be mounted on a vessel;
a superstructure mounted to the base structure, and being provided with:
a top cable guide at a top thereof; and
a boom connection member defining a horizontal pivot axis;
a boom having a longitudinal axis, wherein the boom has an inner end connected to the left-hand connector and right-hand connector of the boom connection member, so that the boom can be pivoted up and down about the horizontal pivot axis which is perpendicular to the longitudinal axis of a boom;
a boom head structure provided at a tip end of the boom;
a luffing device for pivoting the boom up and down, and comprising a luffing winch and a variable length luffing system, the variable length luffing system extending from the luffing winch via the top cable guide to the boom head structure; and
a hoisting device for hoisting a load, and comprising a hoisting winch and an associated hoisting cable, the hoisting cable extending from the hoisting winch to a main hoist cable guide on the boom head structure,
wherein the multi configurations crane system comprises at least the following components for assembling the boom:
a proximal portion configured to be connected to the boom connection member;
a distal portion comprising the boom head structure to which the variable length luffing system and the hoisting cable extend, wherein the distal portion has a first cross-sectional size in a cross-section perpendicular to a longitudinal axis of the distal portion; and
an intermediate portion, wherein the intermediate portion has a second cross-sectional size in a cross-section perpendicular to a longitudinal axis of the intermediate portion which is smaller than said first cross-sectional size of said distal portion,
wherein the multi configurations crane system has at least a first configuration and a second configuration, wherein:
in the first configuration, the intermediate portion is connected to the proximal portion, wherein the distal portion and the intermediate portion are arranged such that their respective longitudinal axes are parallel, wherein an extension mechanism is provided, said extension mechanism being configured to allow the distal portion to be slid relative to the intermediate portion in a longitudinal direction of the boom from a retracted configuration to an extended configuration and vice versa, wherein a locking mechanism is provided for locking the distal portion relative to the intermediate portion in the retracted configuration and in the extended configuration, and wherein in the retracted configuration the intermediate portion is arranged substantially within the distal portion, and in the second configuration, the distal portion is connected to the proximal portion, wherein the boom is assembled without the intermediate portion.

13. The multi configurations crane system according to claim 12, the boom connection member comprising a left-hand connector and a right-hand hand connector at a mutual distance of each other, together defining the horizontal pivot axis, wherein the proximal portion of the boom comprises a left-hand boom leg and a right-hand boom leg of equal length extending between a joint structure and the left-hand connector of the boom connection member and the right-hand connector of the boom connection member, respectively, such that the left-hand boom leg and the right-hand boom leg converge towards each other in the direction of the joint structure, forming a clearance therebetween of an essentially triangular shape seen in a plane defined by the substantially horizontal pivot axis and the longitudinal axis of the boom.

14. The multi configurations crane system according to claim 12, further comprising a further intermediate portion having a third cross-sectional size in a cross-section perpendicular to a longitudinal axis of the boom which is smaller than said first cross-sectional size of said distal portion, wherein the further intermediate portion has a longitudinal length which differs from a longitudinal length of the intermediate portion, wherein the multi configurations crane system has a third configuration, wherein the further intermediate portion is connected to the proximal portion, wherein the distal portion and the further intermediate portion are arranged such that their respective longitudinal axes are parallel, wherein the distal portion is configured to be slid relative to the further intermediate portion in a longitudinal direction of the boom from a retracted configuration to an extended configuration and vice versa, and the distal portion is configured to be locked relative to the further intermediate portion in the retracted configuration and in the extended configuration, and wherein in the retracted configuration the further intermediate portion is arranged substantially within the distal portion.

15. A method for operating the multi configurations crane system according to claim 12, comprising the following steps:

assembling the multi configurations crane system with the intermediate portion directly connected to the proximal portion, and with the intermediate portion directly connected to the distal portion;

hoisting a first load;

at least partially disassembling the boom to remove the intermediate portion;

reassembling the boom with the further intermediate portion connected to the proximal portion, and with the intermediate portion directly connected to the distal portion; and hoisting a second load.

* * * * *